US012728431B2

(12) United States Patent
Marszalek et al.

(10) Patent No.: US 12,728,431 B2
(45) Date of Patent: Sep. 8, 2026

(54) MULTI-JET NOZZLE BODY

(71) Applicant: Aero Pump GmbH, Hochheim/Main (DE)

(72) Inventors: Milena Angelika Marszalek, Mainz (DE); Andreas Mersmann, Hochheim/Main (DE); Sebastian Rother, Mainz (DE)

(73) Assignee: Aero Pump GmbH, Hochheim/Main (DE)

( * ) Notice: Subject to any disclaimer, the term of this patent is extended or adjusted under 35 U.S.C. 154(b) by 242 days.

(21) Appl. No.: 18/391,790

(22) Filed: Dec. 21, 2023

(65) Prior Publication Data

US 2024/0207871 A1 Jun. 27, 2024

(30) Foreign Application Priority Data

Dec. 23, 2022 (DE) ..................... 10 2022 134 680.3

(51) Int. Cl.
*B05B 1/26* (2006.01)
*B23K 26/382* (2014.01)
*B23K 103/00* (2006.01)

(52) U.S. Cl.
CPC .............. *B05B 1/26* (2013.01); *B23K 26/389* (2015.10); *B23K 2103/42* (2018.08)

(58) Field of Classification Search
CPC ........ B05B 1/26; B23K 26/38; B23K 26/389; B23K 2103/42
See application file for complete search history.

(56) References Cited

U.S. PATENT DOCUMENTS 9,353,992 B2 5/2016 Carow et al.
2004/0016095 A1* 1/2004 Liu ........................ B41J 2/1634 29/90.01
2013/0161417 A1 6/2013 Songbe
(Continued)

FOREIGN PATENT DOCUMENTS

CN 202 180 013 4/2012
DE 20 2017 002 851 6/2017
(Continued)

OTHER PUBLICATIONS

Europe Extended Search Report conducted in counterpart Europe Appln. No. 23213370.2 (May 14, 2024).
(Continued)

*Primary Examiner* — Steven M Sutherland
(74) *Attorney, Agent, or Firm* — GREENBLUM & BERNSTEIN, P.L.C.

(57) ABSTRACT

A method for producing a multi-jet nozzle body from a nozzle body blank produced by an injection molding or an additive manufacturing process, and a multi-jet nozzle body. The nozzle body blank defines a fluid chamber and is provided with at least two nozzle geometries having respective axes arranged to extend in a discharge direction and to intersect at a point of intersection outside of the nozzle geometries. The method includes processing, via laser processing, the nozzle body blank to form at least one of: an inflow arranged between one of the at least two nozzle geometries and the fluid chamber; or a funnel arranged between one of the at least two nozzle geometries and the inflow, thereby producing the multi-jet nozzle body.

5 Claims, 5 Drawing Sheets

(56) References Cited

U.S. PATENT DOCUMENTS

| | | | |
|---|---|---|---|
| 2017/0333922 | A1 | 11/2017 | Selby et al. |
| 2019/0048502 | A1 | 2/2019 | Spill et al. |

FOREIGN PATENT DOCUMENTS

| | | | | |
|---|---|---|---|---|
| EP | 2 632 603 | B2 | 7/2015 | |
| EP | 3097981 | A1 * | 11/2016 | .......... A61M 11/001 |
| EP | 3 205 762 | B1 | 4/2018 | |
| EP | 3 315 207 | | 5/2018 | |
| EP | 3 218 032 | | 7/2019 | |
| FR | 2 984 857 | | 6/2013 | |

OTHER PUBLICATIONS

German Office Action conducted in counterpart German Appln. No. 10 2022 134 680.3 (Feb. 4, 2026).

* cited by examiner

2'
8'
2'
X
2'

7
Y

B-B
5'
5'
2'
4'
2'
4'
2'
Y
5'
4'

MULTI-JET NOZZLE BODY

CROSS-REFERENCE TO RELATED APPLICATION

This application claims priority under 35 U.S.C. § 119(a) to German Application No. 10 2022 134 680.3 filed Dec. 23, 2022, the disclosure of which is expressly incorporated by reference herein in its entirety.

BACKGROUND

1. Field of the Invention

Embodiments relate to a method for producing a double/multi jet nozzle body from a nozzle body blank that is produced by injection molding or additive manufacturing. The double/multi jet nozzle body comprises at least two nozzle geometries, and the at least two nozzle geometries each have one axis. The at least two axes extend in a discharge direction and intersect at a point of intersection outside of the nozzle geometries. The nozzle body blank is subsequently processed into the double/multi jet nozzle body using laser processing.

Embodiments furthermore relate to a corresponding double/multi jet nozzle body.

2. Discussion of Background Information

A method for producing a double jet nozzle body follows from EP 3 218 032 B1, for example. In this case, the plastic nozzle body described therein comprises one or more thin-walled segments, wherein the thin-walled segments are supported by one or more thick-walled segments. Additionally, the plastic nozzle arrangement comprises at least two opposing holes having diameters of 5 μm to 100 μm, wherein axes of the holes meet at an angle between 55° and 125° to an outer surface of the thin-walled segment. The holes are furthermore produced by laser drilling.

As a result of physical limitations of the plastic injection molding method and of additive manufacturing, it is not possible to produce thin-walled segments of the double jet nozzle body, or only with great difficulty using a complicated production. Accordingly, holes that are appropriately small must be produced using a subsequent method, the laser drilling method.

However, because at least two nozzle bores must be created, the axes of which meet outside of the nozzle body, the laser drilling method must be applied at least twice. The blank must thereby be oriented each time such that the at least two axes of the at least two nozzle bores align exactly, so that a corresponding functioning of the nozzle can be ensured. Since the nozzle bores are already sized in the μm range, an incorrect alignment of the blank by a few thousandths of an mm or fractions thereof results in an impairment of function. The alignment of the nozzle body blank during the processing with the laser drilling method becomes correspondingly complicated. This exact alignment results in a limitation of cycle times, and therefore in high costs.

SUMMARY

According to embodiments, a method is provided for producing a double jet nozzle body which can be performed cost efficiently. Furthermore, a corresponding double jet nozzle body is described.

In this case, an inflow that is arranged between a nozzle geometry and a fluid chamber is produced using the laser processing and/or a funnel that is arranged between the nozzle geometry and the inflow is produced using the laser processing. A fluid can that is to be ejected through the nozzle geometries can be arranged inside the fluid chamber. Dimensions of the nozzle geometries are then provided in the μm range, so that the at least two nozzle geometries also lie relatively closely on top of one another. This results in the one inflow, which connects one respective nozzle geometry to the fluid chamber, likewise being arranged very close to the other inflow, which connects the other nozzle geometry to the fluid chamber. Accordingly, the inflows are separated from one another only by a thin strip. Using the laser processing, the thin strip can be embodied to be appropriately thin, so that physical limitations of the additive manufacturing or of the plastic injection molding are overcome. Accordingly, the production of a double jet nozzle body is simplified and thereby kept cost efficient.

Since outlets of the at least two nozzle geometries lie close together and the nozzle geometries must be in fluid connection with the fluid chamber, a funnel enables a beneficial fluidic connection between the fluid chamber and the corresponding nozzle geometry. Because the funnel must achieve a fluid flow towards the nozzle geometry starting from the fluid chamber, said funnel must also be produced in appropriate dimensions. Thus, depending on the design of the nozzle geometries, the funnel has at a first region a diameter of the corresponding nozzle geometry, whereas a second region of the funnel is larger than the first region. Accordingly, a corresponding funnel can easily be achieved using the laser processing. Furthermore, a shape of the funnel can be freely chosen due to the laser processing, in particular as part of 3D laser ablation. This allows easy adaptations and good optimization options for the funnel for the purpose of optimizing the double jet nozzle body.

For example, the nozzle body blank can comprise inflows that were already produced using the injection molding method or additive manufacturing, whereas the funnels are subsequently produced using laser processing.

The laser processing preferably comprises methods of laser ablation and/or 3D laser ablation. Laser ablation refers to the removal of material from a surface through bombardment by means of a pulsed laser. The laser or the laser radiation thereby leads to a rapid heating and, consequently, the formation of a plasma on the surface of the workpiece. 3D laser ablation is a special form of laser ablation in which material is processed in three dimensions. Furthermore, a combination of the stated methods is possible, for example. This results in a large design freedom and a large flexibility, whereby it is possible to use each of the methods for the purposes thereof, which saves time and reduces costs.

In laser ablation, a laser beam penetrates a first surface of a workpiece, in this case the nozzle body blank, starting from a laser source without removing, fusing, or evaporating material on the first surface. The laser beam travels through material of the workpiece until it fuses or evaporates, and thus removes, material of a surface located opposite from the first surface. The laser beam can then be realigned in order to remove material at another position. A removal direction is thereby oriented opposite to a propagation direction of the laser beam.

In 3D laser ablation, laser ablation is carried out in three dimensions. Material in all shapes can thus be removed.

Furthermore, 3D laser ablation enables the processing of the nozzle body blank in one clamping step. As a result, a re-clamping of the nozzle body blank is avoided, so that time can be saved and costs reduced in this case.

Through the laser processing, different embodiments of the double jet nozzle body can also be produced starting from one nozzle body blank. Thus, the nozzle body blanks can be produced in large quantities, which is cost efficient.

Preferably, the nozzle geometry is produced with a diameter of less than 300 μm using the laser processing. The nozzle geometries preferably each have a diameter of less than 100 μm. In this case, the term "less than" shall be understood as meaning "less than or equal to."

Preferably, the injection molding method or the additive manufacturing uses a material having at least one main component from the group PMMA, POM, PP, PE, ABS, COC, PA, PC, PBT, PEEK, PEI, PET, and PPE. These are materials which allow a simple adjustment of an injection molding method or of an additive manufacturing.

The laser processing can preferably be combined with a laser drilling method. Laser drilling is likewise a light-saving processing method in which, by means of laser radiation, only so much energy is introduced into the workpiece that the material is fused and partially evaporated. Through a combination of different laser processing methods, such as the laser drilling method, laser ablation, and 3D laser ablation, many different nozzle bodies can be produced from one nozzle body blank. As a result, a cost-efficient method that has a good flexibility is proposed.

Furthermore, embodiments are directed to a double jet nozzle body in which an inflow is arranged between a nozzle geometry and a fluid chamber and/or a funnel is arranged between the inflow and the nozzle geometry, wherein the inflow and/or the funnel can be produced using laser processing. The inflow fluidically connects the nozzle geometry to the fluid chamber. Fluid that is to reach the outside through the nozzle geometry can be arranged in the fluid chamber. Since each of the nozzle geometries is connected to its own inflow and the nozzle geometries are arranged relatively close together as a result of their dimensions, the inflows are likewise arranged relatively close to one another. Accordingly, only a thin strip separates the inflows. This thin strip can be easily produced using a laser processing, whereas it can only be produced with difficulty using an injection molding method or additive manufacturing. The double jet nozzle body can thus be produced cost efficiently.

Each of the at least two nozzle geometries is thereby connected to its own funnel, wherein a narrow end of the funnel is connected to the nozzle geometry and a wide end of the funnel is in fluid connection with the fluid chamber. Since the narrow end of the funnel is connected to the nozzle geometry, said narrow end should also have the dimensions of the nozzle geometry. The funnel must be embodied to be correspondingly filigreed. This is cost-efficiently feasible with a laser processing, for example 3D laser ablation.

The double jet nozzle body can, for example, also comprise a funnel and an inflow for each nozzle geometry, wherein the nozzle geometry is connected to the funnel and the funnel is furthermore connected to the inflow. The inflow is also connected to the fluid chamber in addition to the funnel. In this case, the inflow can already have been produced as part of a nozzle body blank production, for example.

The laser processing preferably comprises methods of laser ablation and/or 3D laser ablation. In laser ablation, material is removed from a surface through bombardment with a pulsed laser beam or pulsed laser radiation. 3D laser ablation is essentially equivalent to laser ablation, though material can be processed in three-dimensional space in 3D laser ablation. Accordingly, if 3D laser ablation is used, a nozzle body blank can be processed in one clamping step. As a result, it is possible to dispense with additional re-clamping procedures in this case, so that the double jet nozzle body is thus produced cost efficiently.

The nozzle geometry preferably has a diameter of <300 μm. Nozzle geometries with a diameter of <100 μm are thereby preferred. Said diameters can be easily, and therefore cost-efficiently, produced using laser processing.

The double jet nozzle body preferably comprises a material having at least one main component from the group PMMA, POM, PP, PE, ABS, COC, PA, PC, PBT, PEEK, PEI, PET, and PPE. These are materials that can be processed using either an injection molding method or additive manufacturing, wherein said materials can be processed simultaneously using laser processing.

The laser processing can preferably be combined with a laser drilling method. In laser drilling, so much energy is locally introduced into the workpiece by means of laser radiation that the material is locally fused and partially evaporated. A fusing of the material at the edge of the bore is thereby not desired. As a result, a large design freedom is achieved, whereby different double jet nozzle bodies can be produced from one nozzle body blank.

The material for the laser processing is transparent, for example, so that different laser processing modes are possible. A good flexibility for the application of different laser processing modes is thus enabled.

It is, for example, also possible for only one region of the nozzle body blank to comprise different materials. The nozzle body blank can thus, for example, comprise transparent material in a location where it is required by a laser processing.

Embodiments are directed to a method for producing a multi-jet nozzle body from a nozzle body blank produced by an injection molding or an additive manufacturing process, where the nozzle body blank defines a fluid chamber and is provided with at least two nozzle geometries having respective axes arranged to extend in a discharge direction and to intersect at a point of intersection outside of the nozzle geometries. The method includes processing, via laser processing, the nozzle body blank to form at least one of: an inflow arranged between one of the at least two nozzle geometries and the fluid chamber; or a funnel arranged between one of the at least two nozzle geometries and the inflow, which thereby produces the multi-jet nozzle body.

In embodiments, the laser processing can include at least one of laser ablation or 3D laser ablation.

In accordance with embodiments, the nozzle geometries may be produced with a diameter of less than or equal to 300 μm using the laser processing.

According to embodiments, the injection molding method can use a material having at least one main component from the group PMMA, POM, PP, PE, ABS, COC, PA, PC, PBT, PEEK, PEI, PET, and PPE.

According to other embodiments, the laser processing can be combined with a laser drilling method.

In other embodiments, each of the at least two nozzle geometries can be in fluid communication with the fluid chamber via respective inflows and funnels.

In accordance with other embodiments, the at least two nozzle geometries may include at least three nozzle geometries having respective axes arranged to extend in a discharge direction and to intersect at a point of intersection outside of the at least three nozzle geometries, and each of the at least three nozzle geometries can be in fluid communication with the fluid chamber via respective inflows and funnels.

Embodiments are directed to a multi-jet nozzle body that includes at least two nozzle geometries having respective axes arranged to extend in a discharge direction and to intersect at a point of intersection outside of the nozzle geometries, at least one of: inflows, which are formed in a nozzle body via laser processing, are respectively arranged between the at least two nozzle geometries and a fluid chamber, or funnels, which are formed in the nozzle body via laser processing, are respectively arranged between the inflows and the at least two nozzle geometries.

In embodiments, the laser processing can include methods of laser ablation and/or of 3D laser ablation.

According to embodiments, the at least two nozzle geometries can have diameters of less than or equal to 300 μm.

In accordance with embodiments, the multi-jet nozzle body may include a material having at least one main component from the group PMMA, POM, PP, PE, ABS, COC, PA, PC, PBT, PEEK, PEI, PET, and PPE.

According to other embodiments, the laser processing may be combined with a laser drilling method.

In accordance with other embodiments, the nozzle body can be formed from a nozzle body blank produced using an injection molding method or additive manufacturing method.

According to still other embodiments, each of the at least two nozzle geometries can be in fluid communication with the fluid chamber via respective inflows and funnels.

In accordance with still yet other embodiments, the at least two nozzle geometries can include at least three nozzle geometries having respective axes arranged to extend in a discharge direction and to intersect at a point of intersection outside of the at least three nozzle geometries, and each of the at least three nozzle geometries are in fluid communication with the fluid chamber via respective inflows and funnels.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
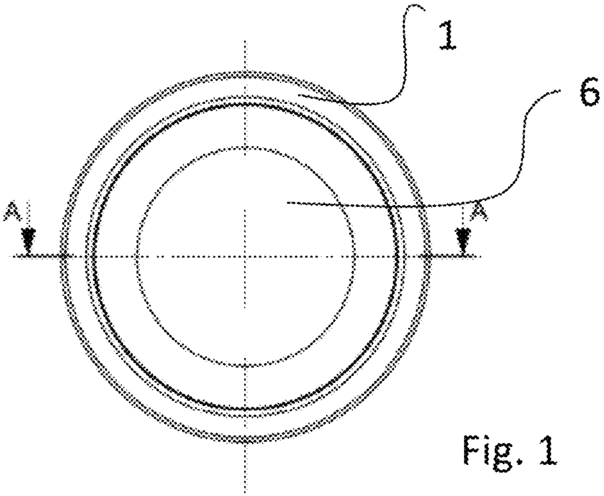
FIG. 1 shows a schematic plan view of a nozzle body blank.

In FIG. 1, a nozzle body blank 1 is illustrated, such as is produced, for example, from an injection molding method or from an additive manufacturing process. As main components, the nozzle body blank 1 comprises, for example, PMMA, POM, PP, PE, ABS, COC, PA, PC, PBT, PEEK, PEI, PET, and PPE, or a combination of the stated materials.

Figure 2:
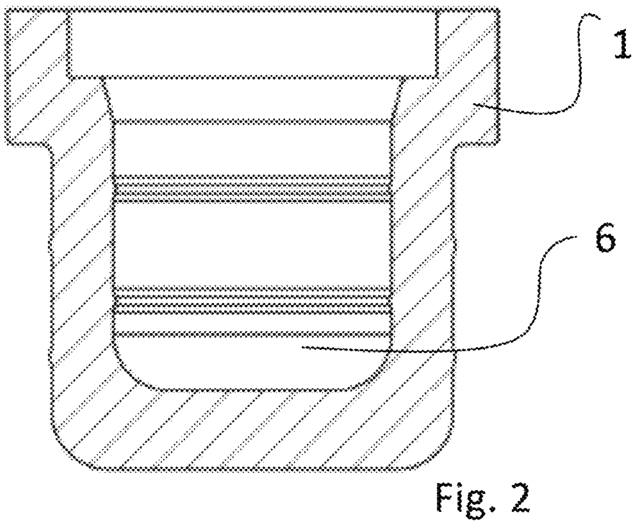
FIG. 2 shows a schematic sectional illustration of a nozzle body blank.

In FIG. 2, the nozzle body blank 1 is depicted with a view of a fluid chamber 6 in a sectional illustration according to FIG. 1. The nozzle body blank 1 comprises elements which can be produced using an injection molding method or additive manufacturing. The nozzle body blank 1 is subsequently transferred to laser processing.

Figure 3:
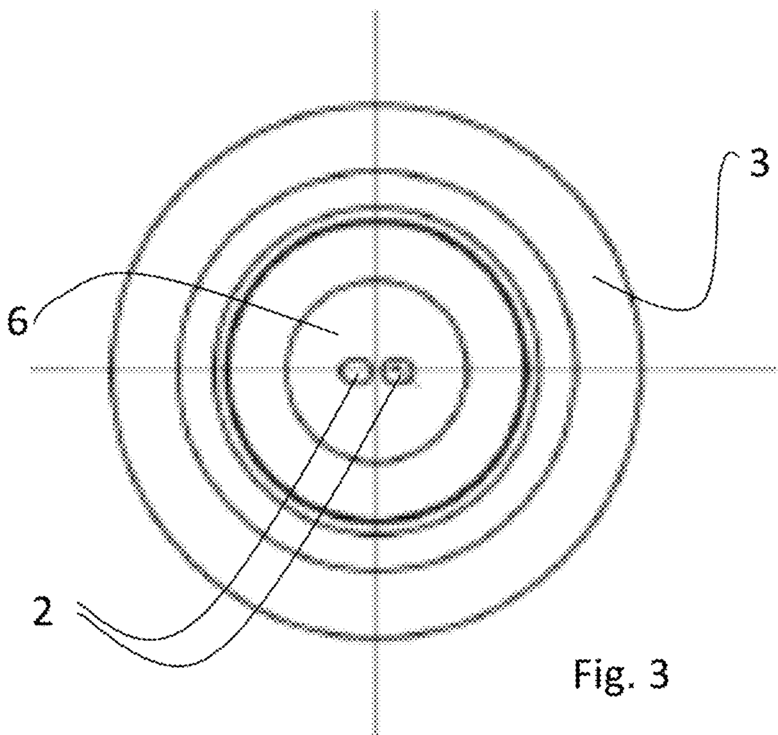
FIG. 3 shows a plan view of a nozzle body blank with two inflows.

In FIG. 3, a plan view of the nozzle body blank 1 is shown, in which nozzle body blank 1 is processed to include two inflows 2 in communication with fluid chamber 6. These two inflows 2 are arranged in mirror symmetry in the present exemplary embodiment. A diameter direction of the nozzle body blank 1 thereby serves as the mirror axis. In an alternative embodiment of the nozzle body blank 1 is likewise possible, so that the inflows can also be positioned differently. With this construction, nozzle body blank 1 can be understood to form a double jet nozzle body 3.

Figure 4:
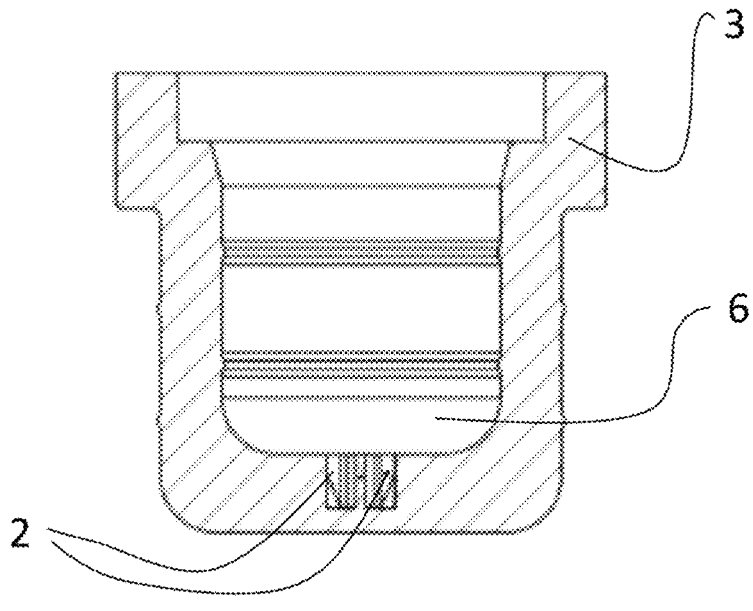
FIG. 4 shows a schematic sectional illustration of a nozzle body blank with two inflows, FIG. 5 a schematic sectional illustration of a double jet nozzle body.

In FIG. 4, the double jet nozzle body 3 is illustrated to show the two inflows 2 arranged along the section line depicted in FIG. 3.

The inflows 2 illustrated in FIGS. 3 and 4 can be created either using the injection molding method or using additive manufacturing. Alternatively to the additive manufacturing or the injection molding method, the inflows 2 can also be produced using a laser processing.

Figure 5:
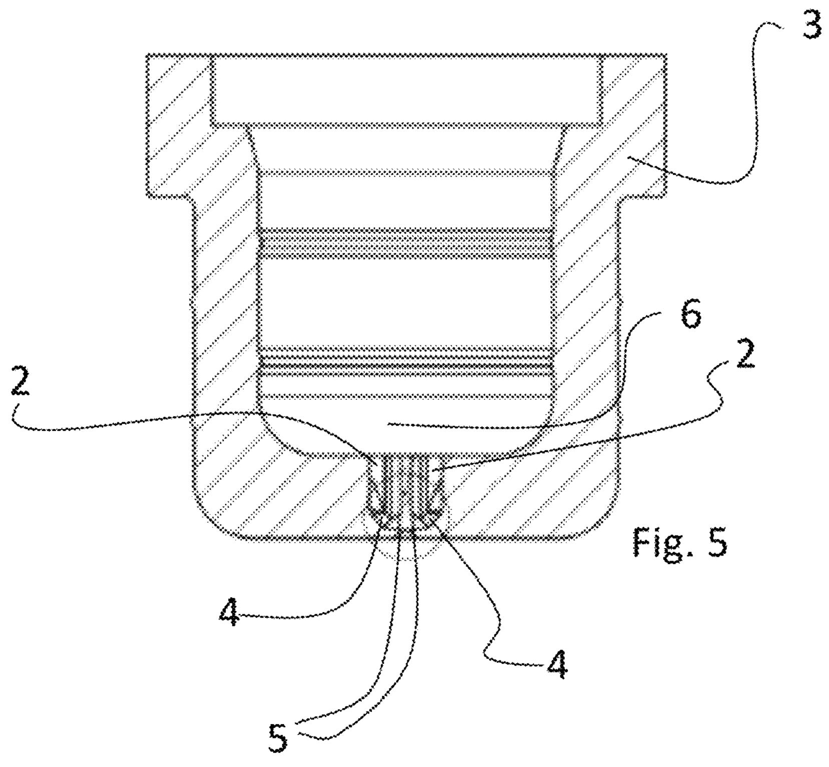

FIG. 5 shows double jet nozzle body 3 which, in addition to inflows 2 and a fluid chamber 6, also comprises funnels 4 and two nozzle geometries 5.

Figure 6:
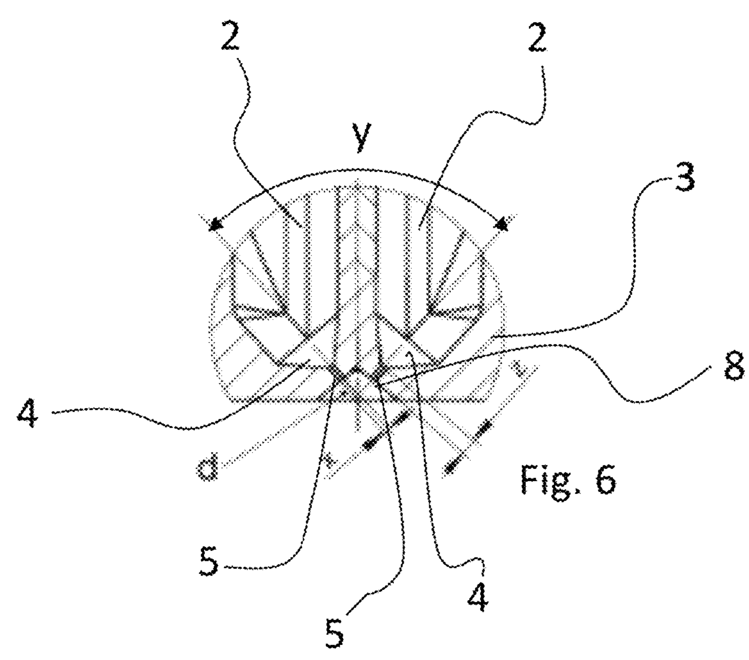
FIG. 6 shows a detailed view of the nozzle geometries shown in FIG. 5.

In FIG. 6, a detailed view of the nozzle geometry arrangement in FIG. 5 is shown. The nozzle geometries 5 thereby have a diameter X and a length Z. Furthermore, the nozzle geometries 5 each have one axis, wherein the two axes form an angle Y. The two axes intersect outside of the nozzle geometries in a discharge direction. The discharge direction is thereby defined along a fluid discharge. The two nozzle geometries 5 open into an ejection recess 8.

Figures 7, 8, 9:
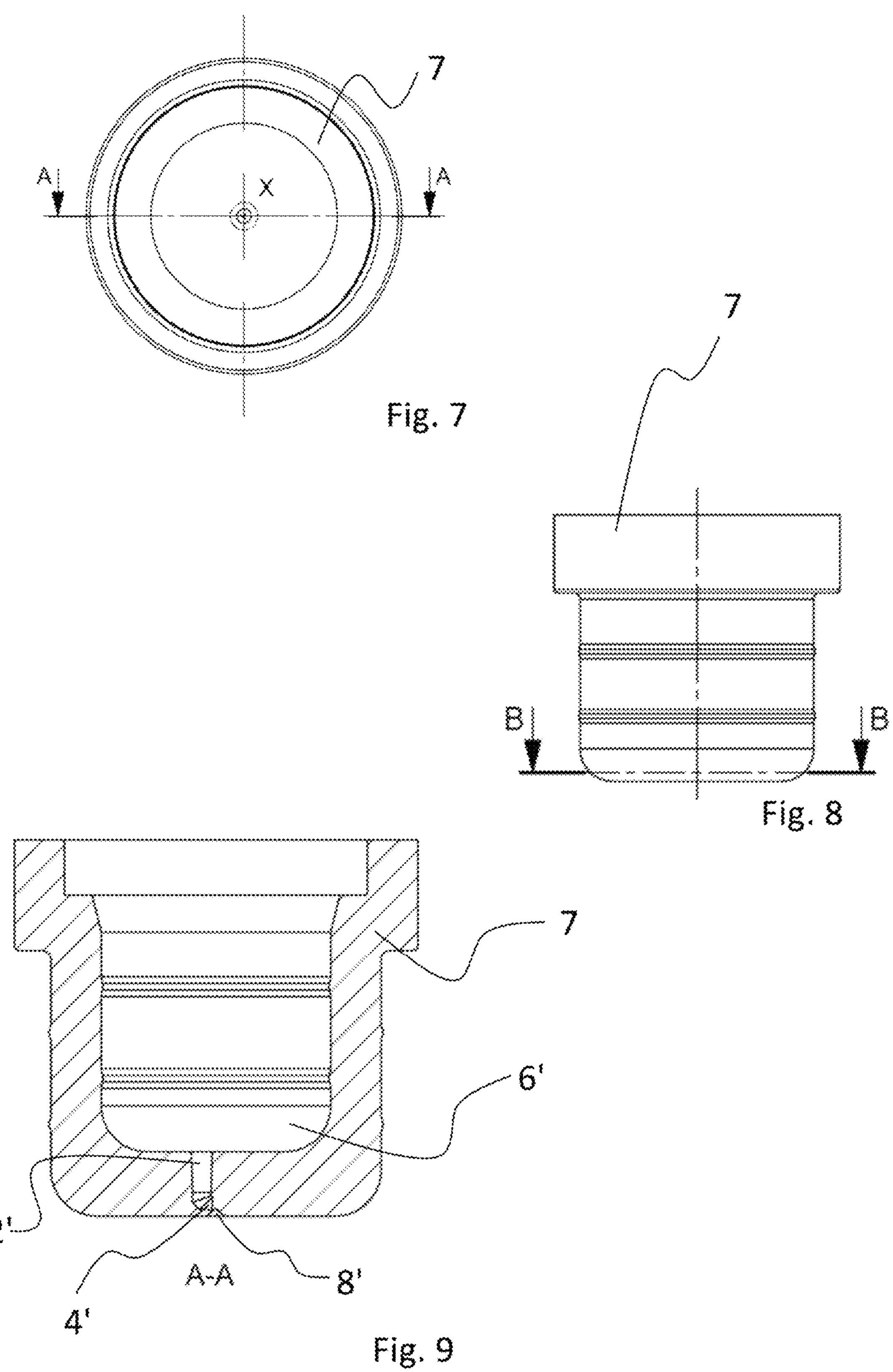
FIG. 7 shows a schematic plan view of a triple jet nozzle body.
FIG. 8 shows a schematic side view of a triple jet nozzle body.
FIG. 9 shows a schematic sectional illustration of a triple jet nozzle body.

In FIG. 7, there is a schematic plan view of a triple jet nozzle body 7. The triple jet nozzle body comprises three inflows 2' extending to respective nozzle geometries 5' via funnels 4'. The three inflows 2' are formed in triple jet nozzle body 7 in an area located within detail X (see FIG. 10).

FIG. 8 shows a schematic side view of the triple jet nozzle body 7.

FIG. 9 is a sectional illustration of the triple jet nozzle body 7 shown in FIG. 8, along the line A-A. One inflow 2', one funnel 4', and one nozzle geometry 5' are depicted in the sectional illustration. The two remaining inflows, funnels, and nozzle geometries are not shown in the sectional illustration. Additionally, the triple jet nozzle body 7 also comprises a fluid chamber 6'. A construction of each nozzle geometry 5', funnel 4' and inflow 2' in triple jet nozzle body 3' is identical to the construction in the double jet nozzle body 3 described above, except in the case of the triple jet nozzle body 7, three nozzle geometries 5', three funnels 4', and three inflows 2' are arranged. The nozzle geometries 5' open into an ejection recess 8'.

Figures 10, 11, 12:
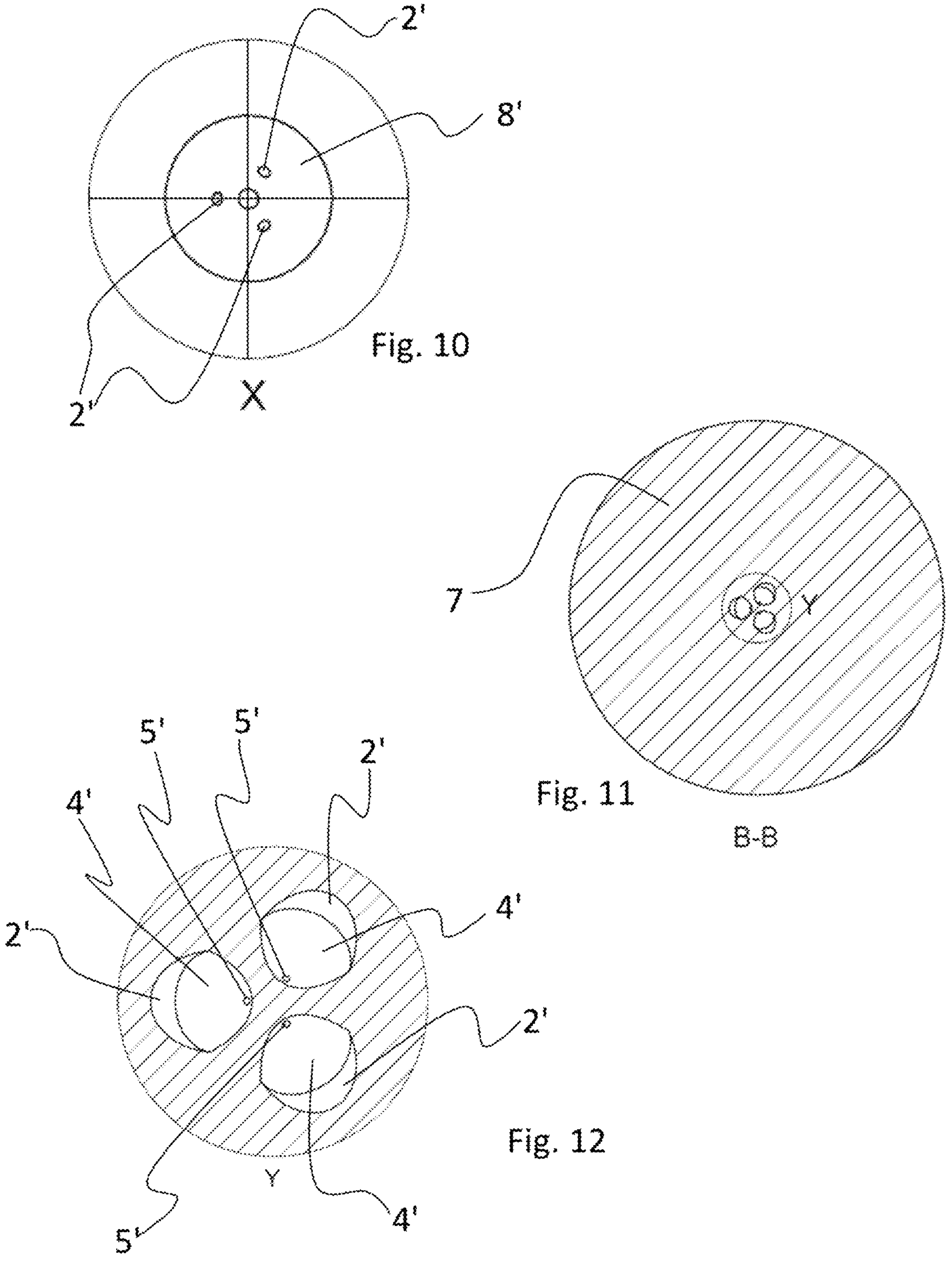
FIG. 10 shows a schematic detailed illustration of the triple jet nozzle body.
FIG. 11 shows a schematic sectional illustration of a triple jet nozzle body.
FIG. 12 shows a schematic detailed view of the sectional illustration of a triple jet nozzle body.

FIG. 10 shows the three inflows 2', which are located within the area depicted in detail X shown in FIG. 7. The inflows 2' are arranged in rotational symmetry. The triple jet nozzle body 7 comprises the ejection recess 8' into which the three nozzle geometries 5' open.

FIG. 11 shows a sectional illustration of the triple jet nozzle body 7, which is taken from the sectional line B-B depicted in FIG. 8.

FIG. 12 shows a detail Y of FIG. 11, where it can be seen that inflows 2' transition into funnels 4', and nozzle geometries 5' are arranged at respective narrow ends of the funnels 4'. The nozzle geometries 5' are thereby arranged such that their axes intersect outside of the triple jet nozzle body 7. This essentially corresponds with the construction/arrangement of double jet nozzle body 3, except that, in the case of the triple jet nozzle body 7, three jets, not two, meet outside of triple jet nozzle body 7.

The triple jet nozzle body 7 can be produced from one nozzle body blank 1, wherein the nozzle geometries 5', the funnels 4', and/or the inflows 2' can be produced using a laser processing. Furthermore, the ejection recess 8 can be produced using a laser processing, for example.

The nozzle body blank 1, the double jet nozzle body 3, and the triple jet nozzle body 7 each comprise a fluid chamber 6 in which a fluid can be arranged so that said fluid can be ejected through the nozzle geometries 5, 5'. The ejection of the fluid thus takes place towards a discharge direction that extends accordingly from the fluid chamber 6 to the nozzle geometries 5, 5' via the inflows 2, 2' and the funnels 4, 4'.

The laser processing can thereby comprise methods of laser ablation, of laser drilling, and/or of 3D laser ablation.

In laser drilling, material of the workpiece is heated so intensively in a short period of time by a laser that said material fuses and partially evaporates. The removal direction is thereby oriented along the laser propagation direction. Thus, work is performed along the laser direction in laser drilling.

In laser ablation, the laser beam penetrates a first surface which faces the laser generating apparatus, travels through the material of the workpiece, and evaporates material on a top side of a reverse side of the workpiece. This is repeated until corresponding structures have been obtained. The removal direction is thereby essentially opposite to the laser propagation direction. The same principle is also applied in 3D laser application, though in 3D laser ablation, three-dimensional structures can be created. It is thus possible to create undercuts or other complex shapes using 3D laser ablation, provided that evaporated plastic or evaporated material can escape to the outside.

Through the combination of the different laser processing modes, the nozzle body blank can be processed in one clamping step to such an extent that the nozzle body blank no longer requires any subsequent work at all.

Additionally, different geometries of the inflows 2, 2', the funnels 4, 4' or the nozzle geometries 5, 5' can easily be implemented starting from one nozzle body blank 1. As a result, a high quantity of nozzle body blanks 1 can be produced using an injection molding method, so that these blanks can then be processed using the laser processing according to the respective embodiment.

In addition to the double jet nozzle bodies 3 and triple jet nozzle bodies 7 shown here, other multi-jet nozzle bodies not depicted can also be produced using a laser processing. Thus, without departing from the spirit and scope of the disclosed embodiments, a nozzle body blank 1 can be processed into a multi-jet nozzle body using laser processing so that the finished multi-jet nozzle body comprises more than three nozzle geometries 5, 5' inflows 2, 2' and funnels 4, 4' and the axes of the nozzle geometries 5, 5' intersect at a point outside of the multi-jet nozzle body.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SYMBOLS

1 Nozzle body blank
2,2' Inflows
3 Double jet nozzle body
4,4' Funnel
5,5' Nozzle geometry
6,6' Fluid chamber
7 Triple jet nozzle body
8,8' Ejection recess
X Diameter of the nozzle geometry
Y Angle of the axes of the nozzle geometries to one another
Z Length of the nozzle geometry

What is claimed:

1. A method for producing a multi-jet nozzle body from a nozzle body blank produced by an injection molding or an additive manufacturing process, the nozzle body blank defining a fluid chamber and being provided with at least two nozzle geometries having respective axes arranged to extend in a discharge direction and to intersect at a point of intersection outside of the nozzle geometries, the method comprising:

processing, via laser processing, the nozzle body blank to form an inflow arranged between one of the at least two nozzle geometries and the fluid chamber; and a funnel arranged between one of the at least two nozzle geometries and the inflow, thereby producing the multi-jet nozzle body, wherein the laser processing comprises a laser drilling method in which the laser processing is performed along a laser direction and at least one of laser ablation or 3D laser ablation in which a removal direction is essentially opposite to a laser propagation direction and a laser beam penetrates a first surface which faces a laser generating apparatus, travels through a material of the nozzle body blank, and evaporates material on a top side of a reverse side of the nozzle body blank.

2. The method according to claim 1, wherein the nozzle geometries are produced with a diameter of less than or equal to 300 μm using the laser processing.

3. The method according to claim 1, wherein the injection molding method uses a material having at least one main component from the group PMMA, POM, PP, PIE, ABS, COC, PA, PC, PBT, PEEK, PEI, PET, and PPE.

4. The method according to claim 1, wherein each of the at least two nozzle geometries are in fluid communication with the fluid chamber via respective inflows and funnels.

5. The method according to claim 1, wherein the at least two nozzle geometries comprise at least three nozzle geometries having respective axes arranged to extend in a discharge direction and to intersect at a point of intersection outside of the at least three nozzle geometries, and wherein each of the at least three nozzle geometries are in fluid communication with the fluid chamber via respective inflows and funnels.

* * * * *